United States Patent
Dayt

(10) Patent No.: US 8,726,462 B2
(45) Date of Patent: May 20, 2014

(54) FURNITURE CASTOR OR THE LIKE WITH BLOCKING MEANS

(75) Inventor: Patrick Dayt, Besancon (FR)

(73) Assignee: Tente Roulettes Polymeres-Bruandet, La Barre (FR)

( * ) Notice: Subject to any disclaimer, the term of this patent is extended or adjusted under 35 U.S.C. 154(b) by 106 days.

(21) Appl. No.: 13/577,497

(22) PCT Filed: Feb. 17, 2011

(86) PCT No.: PCT/FR2011/000098
§ 371 (c)(1),
(2), (4) Date: Aug. 7, 2012

(87) PCT Pub. No.: WO2011/101562
PCT Pub. Date: Aug. 25, 2011

(65) Prior Publication Data
US 2012/0317752 A1   Dec. 20, 2012

(30) Foreign Application Priority Data
Feb. 19, 2010 (FR) ........................... 10 00688

(51) Int. Cl.
*B60B 33/00* (2006.01)
(52) U.S. Cl.
USPC ........................................ 16/35 R
(58) Field of Classification Search
USPC ............................... 16/35 R, 18 R
See application file for complete search history.

(56) References Cited

U.S. PATENT DOCUMENTS

| | | | | |
|---|---|---|---|---|
| 2,972,163 A * | 2/1961 | Ross et al. | ...................... | 16/35 R |
| 3,772,733 A * | 11/1973 | Stosberg et al. | .............. | 16/35 R |
| 4,035,864 A * | 7/1977 | Schroder | ........................ | 16/35 R |
| 4,706,328 A * | 11/1987 | Broeske | ......................... | 16/35 R |
| 4,941,552 A * | 7/1990 | Screen | ........................... | 16/35 R |
| 5,383,536 A * | 1/1995 | Butter et al. | ................. | 188/1.12 |
| 5,632,360 A * | 5/1997 | Melara | ........................... | 16/35 R |
| 5,988,323 A * | 11/1999 | Chu | .............................. | 16/35 R |
| 6,532,624 B1 * | 3/2003 | Yang | ............................. | 16/35 R |

(Continued)

FOREIGN PATENT DOCUMENTS

DE   19721033 C1   4/1998
DE   202007015784 U1   1/2008

(Continued)

OTHER PUBLICATIONS

International Search Report dated Jul. 26, 2011, from corresponding PCT application.

*Primary Examiner* — Jeffrey O Brien
(74) *Attorney, Agent, or Firm* — Young & Thompson

(57) ABSTRACT

A castor with combined blocking includes a casing 10, a wheel 12, 14 mounted to rotate relative to the casing about an axis 18, a swivel 20 of axis 22 mounted to pivot relative to the casing, the axis being perpendicular to the axis, blocking elements 100 for blocking the swivel, control elements 102 for actuating the blocking elements, blocking elements 200 for blocking the wheel, control elements 202 for actuating the blocking elements 200, and elements 300 for coupling the control elements 102, 202 in such a manner that when the blocking elements 100 are actuated alone by the control elements 102, the blocking elements 200 are not actuated, and when the blocking elements 200 are actuated by the second control elements, the first blocking elements 202 are also actuated by the first control elements 102. The castor is applicable for hospital use, such hospital beds or the like.

7 Claims, 4 Drawing Sheets

(56) References Cited

U.S. PATENT DOCUMENTS

| | | | |
|---|---|---|---|
| 6,575,052 B2 * | 6/2003 | Toennesland et al. | 16/35 R |
| 6,810,560 B1 * | 11/2004 | Tsai | 16/35 R |
| 6,854,567 B2 * | 2/2005 | Suzuki | 16/35 R |
| 7,516,512 B2 * | 4/2009 | Tsai | 16/35 R |
| 7,520,021 B2 * | 4/2009 | Chou | 16/35 R |
| 7,614,115 B2 * | 11/2009 | Yan | 16/35 R |
| 7,861,370 B2 * | 1/2011 | Chu | 16/35 R |
| 7,926,145 B2 * | 4/2011 | Liao | 16/35 R |
| 8,087,127 B2 | 1/2012 | Dayt | |
| 8,302,257 B2 * | 11/2012 | Lin | 16/35 R |
| 2003/0019075 A1 * | 1/2003 | Trevini | 16/35 R |
| 2004/0020008 A1 * | 2/2004 | Harris et al. | 16/35 R |
| 2006/0236501 A1 * | 10/2006 | Chou | 16/35 R |
| 2008/0005868 A1 * | 1/2008 | Chou | 16/35 R |
| 2009/0019670 A1 * | 1/2009 | Tsai | 16/35 R |
| 2009/0113671 A1 * | 5/2009 | Chu | 16/35 R |
| 2009/0276977 A1 | 11/2009 | Liao | |
| 2010/0170061 A1 * | 7/2010 | Lin | 16/35 R |

FOREIGN PATENT DOCUMENTS

| | | |
|---|---|---|
| DE | 202008010367 U1 | 10/2008 |
| EP | 1629999 A2 | 3/2006 |
| WO | 2007074221 A1 | 7/2007 |

* cited by examiner

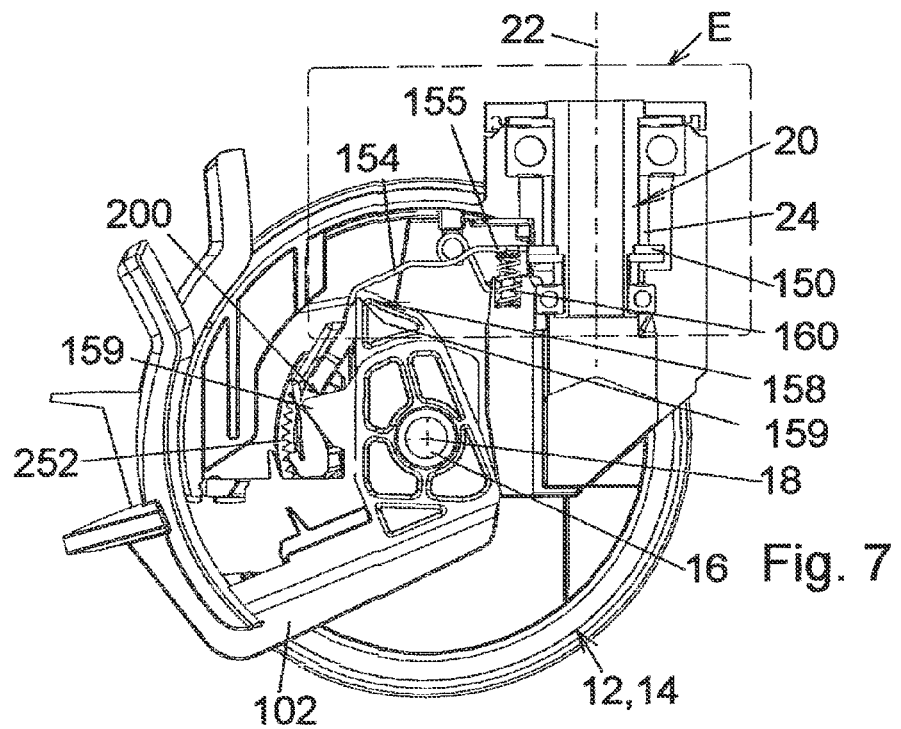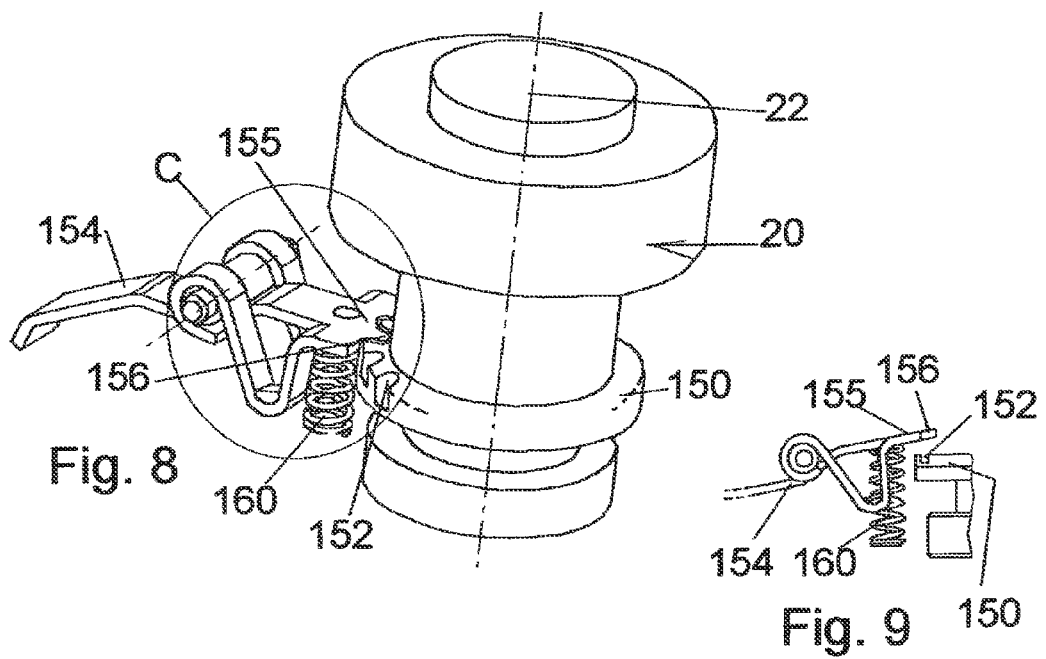

FURNITURE CASTOR OR THE LIKE WITH BLOCKING MEANS

BACKGROUND OF THE INVENTION

1. Field of the Invention

The present invention relates to castors for furniture or the like, a castor essentially comprising a casing for supporting and protecting wheels, and a swivel that provides the connection between the casing and the furniture.

2. Description of the Related Art

Many such castors are particularly advantageous for use in moving beds, chairs, tables, carts, etc., more particularly in hospital settings or the like.

The structure of such a castor must therefore be designed in such a manner as to enable a piece of furniture such as hospital beds to be moved in any direction. In particular, the castor comprises at least one wheel (generally two wheels in parallel) and means to enable the wheel to rotate about a horizontal axis relative to the casing in order to allow the furniture to be moved in straight line translation, together with means to enable the casing to pivot about a substantially vertical axis relative to the furniture so that the castor can take up any direction relative to the furniture.

Nevertheless, when the furniture has nearly reached its final position, it is sometimes necessary to block the castor against swiveling movement, while enabling its wheel to continue to rotate about its horizontal axis, e.g. in order to enable the bed to be moved further in translation in a perfectly straight line without it being capable of changing its orientation. Once the bed has reached its final position, it is then necessary to block rotation of the wheel in order to prevent the bed from moving again.

In other circumstances, it may be necessary to block the castor against movement in translation and against swiveling movement.

Castors already exist that seek to satisfy the above-defined conditions, such as those described and shown in German patent No. 197 21 033 and in US-A-2009/276977. Nevertheless, they do not give full satisfaction both functionally and structurally speaking.

BRIEF SUMMARY OF THE INVENTION

Thus, an object of the present invention is to provide a castor that attempts to satisfy the above-mentioned objects, that presents a structure that enables its component parts to be made industrially, and that enables said parts to be assembled easily in order to obtain the castor in its final form.

More precisely, the present invention provides a castor with combined blocking, the castor comprising: a casing; at least one wheel; means for mounting the wheel to rotate relative to the casing on a shaft defined on a first axis; a swivel defined on a second axis; means for mounting the swivel to pivot relative to the casing with the second axis substantially perpendicular to the first axis; first controllable blocking means for blocking pivoting of the swivel relative to the casing; first control means for actuating said first controllable blocking means; second controllable blocking means for blocking rotation of the wheel relative to the casing; and second control means for actuating said second controllable blocking means;

the castor being characterized by the fact that it further comprises means for coupling said first and second control means in such a manner that: when the first controllable blocking means are actuated on their own by said first control means, the second controllable blocking means are not actuated; and when at least the second controllable blocking means are actuated by said second control means, the first controllable blocking means are also actuated by said first control means.

BRIEF DESCRIPTION OF THE DRAWINGS

Other characteristics and advantages of the invention appear from the following description given with reference to the accompanying drawings that are provided by way of non-limiting illustration, and in which:

FIG. 7 is a side view of a second embodiment of the castor of the invention;

FIG. 8 is a perspective view of the portion in the box marked E in FIG. 7, showing that embodiment in a "blocking" configuration; and FIG. 9 is a side view of the portion in the circle marked C in FIG. 8 in a "non-blocking" configuration.

DETAILED DESCRIPTION OF THE PREFERRED EMBODIMENTS

Figure 1:
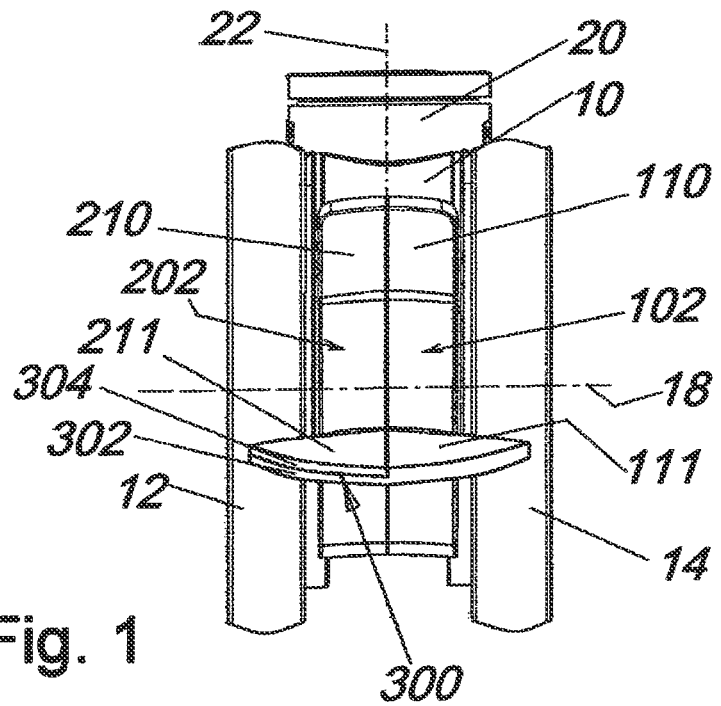
FIG. 1 is a front view of a first embodiment of a castor of the invention.

The present invention relates to a castor comprising a casing 10, at least one wheel 12, 14, means for mounting the wheel rotatably relative to the casing on a shaft 16 defined on a first axis 18, a swivel 20 defined on a second axis 22, and means 24 for mounting the swivel to pivot relative to the casing 10, with the second axis 22 being substantially perpendicular to the first axis 18.

The castor also includes first controllable blocking means 100 for blocking pivoting of the swivel 20 relative to the casing 10, first control means 102 for actuating the first controllable blocking means 100, second controllable blocking means 200 for blocking rotation of the wheel 12, 14 relative to the casing 10, and second control means 202 for actuating the second controllable blocking means 200.

A castor having the characteristics defined above by their main functions is known, in particular from WO 2007/074221 in the name of the Applicant, the description of which forms an integral part of the present description.

According to other characteristics of the invention, the castor also includes means 300 (FIG. 1) for coupling the first and second control means 102 and 202 so that when the first controllable blocking means 100 are actuated alone by the first control means, the second controllable blocking means 200 are not actuated, and so that when at least the second controllable blocking means 200 are actuated by the second control means 202, the first controllable blocking means 100 are also actuated by the first control means 102.

These characteristics enable the castor of the invention to achieve the objects defined in the introduction of the present description.

Firstly, it is specified that the term "controllable blocking means" for blocking pivoting on rotation of one element relative to another, is used to cover any means that enable this function to be achieved. In particular, they may comprise brakes, e.g. friction brakes or the like, or else means that operate by meshing between a finger secured to one of the two elements and suitable for occupying a groove secured to the other element. Where necessary such meshing means are referred to in the present description under the generic term "catches".

The castor of the invention as defined above is most advantageously embodied as shown in accompanying FIGS. 1 to 6.

In this first embodiment as shown in FIGS. 1 to 6, the first and second control means 102 and 202 respectively for actuating the first and second controllable blocking means 100 and 200 comprise (more particularly with reference to FIGS. 1, 2, and 4) respectively a first pedal 110 and a second pedal 210, both mounted to pivot on the shaft 16, each pedal 110, 210 having at least one end 111, 211 that emerges from the casing 10, e.g. a plate on which it is possible to place a foot in order to actuate the pedal, each pedal 110, 210 being pivotally mounted on the shaft 16 so as to occupy any position between a so-called "rest" position and a so-called "actuation" position.

Figure 2:
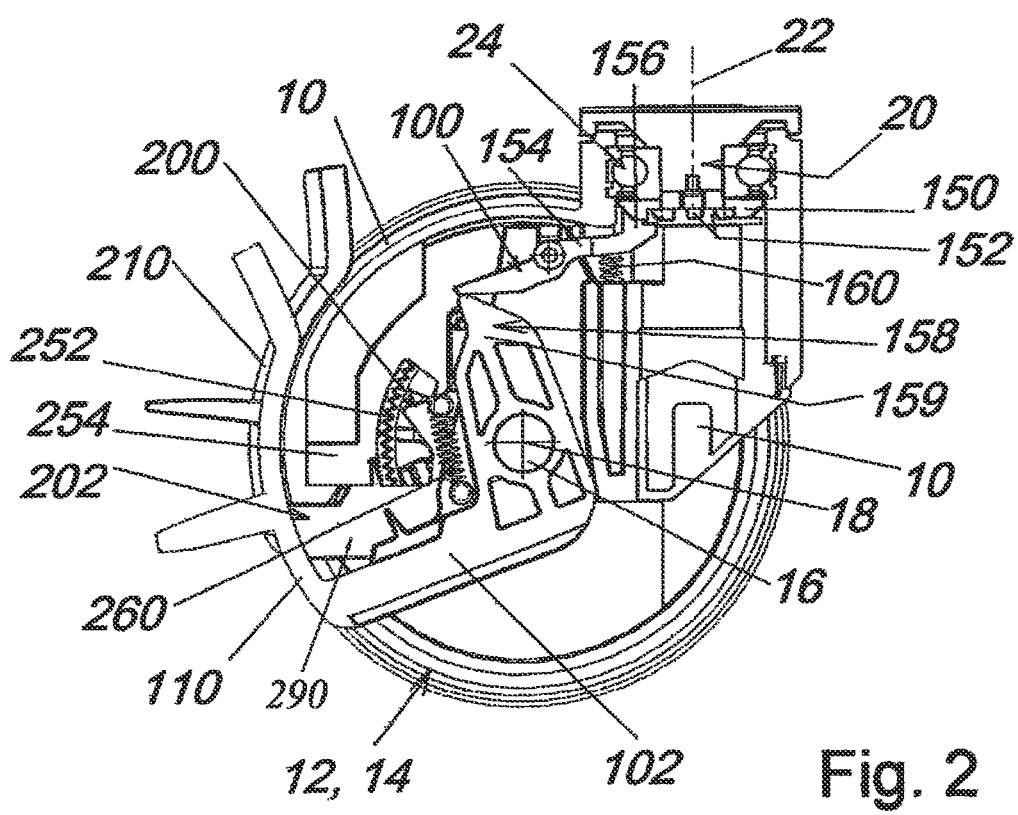
FIG. 2 is a side view in section and slightly in perspective showing the castor of the invention in the embodiment of FIG. 1, showing up some of the main structural means of the castor, in particular those relating to means for blocking swiveling relative to its casing.
Figure 3:
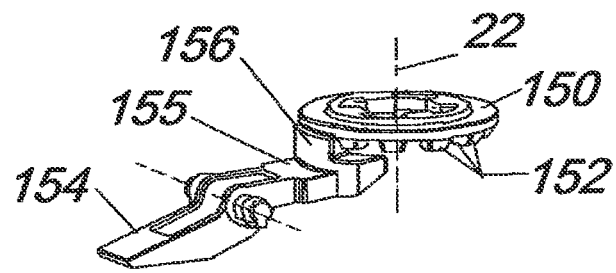
FIG. 3 is a perspective view for showing more clearly how two of the elements shown in FIG. 2 co-operate.

The rest position is the position in which a pedal does not actuate the corresponding controllable blocking means 100, 200 (FIGS. 1 and 2), and the actuation position is the position in which a pedal actuates the corresponding controllable blocking means 100, 200 (in FIG. 2, there can be seen the actuation position for the pedal 110 and the rest position for the pedal 210).

In this embodiment in which the control means 102, 202 are constituted by pedals, the coupling means 300 are most advantageously constituted (as shown in FIG. 1) by an abutment 302 made on the first pedal 110, e.g. on its emerging end 111, and a companion abutment 304 connected to the second pedal 210 that is constituted by the emerging end 211, itself of the second pedal 210.

This abutment 302 and this companion abutment 304 are arranged relative to each other on their respective pedals so that:

the companion abutment 304 is in contact with the abutment 302 when both pedals 110, 210 are in their rest position;

when the first pedal 110 is the only pedal to be caused to pivot about the first axis 18 in order to go from its rest position to its actuation position, the abutment 302 moves away from the companion abutment 304; and when the second pedal 210 is driven to pivot about the first axis 18 to go from its rest position to its actuation position, the companion abutment 304 entrains the abutment 302 in the same pivoting movement, thereby correspondingly entraining the first pedal 110 so as to cause it also to go from its rest position to its actuation position.

For a purpose that is explained below, the castor also includes link means 400 (FIG. 6) mounted to co-operate between the two pedals 110 and 210, these link means being arranged in such a manner that the two pedals are held lightly relative to each other in at least one given position, and may be disengaged from this given position when they are subjected to a relatively low level of torque.

In a possible embodiment that is preferred in terms of industrial fabrication, in particular by molding materials such as plastics materials, these link means 400 are constituted: by a circularly cylindrical orifice 402 formed in one of the two pedals (in FIG. 6, this orifice is formed in the pedal 210), with the axis of the orifice coinciding with the first axis 18; by at least a portion of a circularly cylindrical sleeve 404 made projecting from the other pedal (the pedal 110 in the embodiment shown) and of diameter no greater than that of the orifice 402 in order to be receivable therein; and by two sets of lugs 406, 408 formed respectively on the facing cylindrical faces of the orifice 402 and of the sleeve portion 404 (the term "sets" should be understood as meaning that one of the sets has a plurality of lugs while the other need have only one), so that at least one lug of one set co-operates by meshing between two lugs of the other set and is suitable for passing over the lugs of the other set by elastic deformation as a result of a force being applied on one of the pedals relative to the other pedal. The function of these two sets of lugs is defined below in the portion of the description relating to the use of the castor.

As mentioned above, the castor includes first controllable blocking means 100 for blocking pivoting of the swivel 20 relative to the casing 10. In a first embodiment, these means 100 comprise (see more particularly FIGS. 2 and 3, and also shown in part in FIGS. 4 and 5): a ring 150 having male and female first catches 152, the ring being mounted to co-operate with the swivel 20 in coaxial manner, e.g. by being securely fastened thereto; and a first lever 154, one end 155 of the first lever including at least a male second catch 156, this first lever also being pivotally mounted between a first position and a second position relative to the casing 10 in such a manner that in its first position (FIGS. 2 and 3) the male second catch 156 penetrates into one of the female first catches, and in its second position (FIG. 4), the male second catch 156 does not co-operate with any of the first catches 152.

These controllable blocking means 100 further include first resilient return means 160 urging the first lever 154 to return from its second position to its first position, and first means 158 for causing the first lever 154 to pivot between its first and second positions, these first means for controlling pivoting of the first lever being mounted in co-operation on the first pedal 110.

In a possible embodiment, these first means for controlling pivoting of the first lever are constituted by a projecting portion 159 arranged in secure manner on the first pedal 110 so that when said pedal is in its rest position the projecting portion 159 acts on the first lever 154 to cause it to pivot clockwise in the figures and move into its second position in which the catch 156 does not co-operate with the catches 152, and in contrast the first lever compresses the spring 160. When the first pedal 110 is pivoted counterclockwise to occupy its actuation position (FIG. 2), the projecting portion 159 releases the first lever 154 to pivot at least in part so that under drive from the spring 160 it pivots counterclockwise so that the catch 156 takes up a position in one of the catches 152 of the ring 150 so as to block it relative to the casing to which the first lever 154 is linked.

The second controllable blocking means 200 for blocking rotation of the wheel 12, 14 relative to the casing comprise, in most advantageous manner: male and female third catches 252 made on the face 254 of the wheel for blocking that faces towards the casing 10 (FIGS. 2, 4, and 5); and a second lever 256 pivotally mounted on the casing via a first end 281 to pivot about a third axis 280 that is substantially parallel to the first axis 18 (FIGS. 4 and 5), this second lever carrying at least a male fourth catch 258 (advantageously a plurality of catches) complementary to the female third catches 252 (FIG. 5), and being mounted to pivot relative to the casing 10 between a third position and a fourth position so that in the third position of the second lever 256 the male fourth catch 258 penetrates into one of the female third catches 252, and in the fourth position of the second lever, the fourth catch 258 does not co-operate with any of the third catches 252.

These second controllable blocking means 200 also include resilient tensioning means 270 tending to hold the second lever 256 in its fourth position, second means 290 for causing the second lever to pivot between its fourth and third positions, these second means 290 for controlling pivoting of the second lever being mounted in co-operation on the second pedal 210, and advantageously also third controllable return means 260 such as a traction spring that can be seen in FIG. 2, tending to cause the second pedal 210 to go from its actuation position to its rest position.

In a possible embodiment, the resilient tension means 270 tending to hold the second lever 256 in its fourth position are constituted by a spring blade 271 (FIGS. 4 and 5) having a first end 272 secured to the second end 283 of the second lever 256 so as to co-operate with the second lever to form substantially a V-shape, the second end 273 of the spring blade 271 co-operating with the casing 10 by sliding in contact with its inside surface. These means could also be constituted by any other resilient spring means.

The second means 290 for causing the second lever 256 to pivot between its fourth and third positions and mounted in co-operation on the second pedal 210 are advantageously constituted by another projecting portion 259 (FIGS. 4 and 6) arranged securely on the second pedal 210 in such a manner that when said pedal is in its rest position, the projecting portion acts on the second lever 256 to force it to pivot counterclockwise in the figures automatically under drive from the spring 260 and the spring blade 271 so that it occupies its second position, i.e. the position in which the catch 258 does not co-operate with the catches 252. In contrast, when the pedal 210 is pivoted counterclockwise to occupy its actuation position, the projecting portion 259 entrains pivoting of the second lever 256 in the clockwise direction (FIG. 4) and loads the spring blade 271, the male fourth catch(es) 258 then taking up a position in one of the catches 252 formed in the face 254 of the wheel(s) 12, 14 so as to block it(them) relative to the casing to which the second lever 256 is linked.

The castor described above with reference to FIGS. 1 to 6 is used as follows:

It is initially assumed that the castor is securely fastened in conventional manner to the leg of a piece of furniture, such as a hospital bed or the like, via the swivel 20, and that the castor is in a configuration that enables the bed to be moved both ways in any direction.

Under such conditions, the two pedals 110, 210 are both in their rest position (FIG. 1) with the companion abutment 304 against the abutment 302.

The first lever 154 is in its second position compressing the spring 160, with the catch 156 not in position in the catches 152. The second lever 256 is in its fourth position, with the fourth catch 258 not in position in the third catches 252. The spring blade 271 is relaxed, as is the spring 260.

If a user seeks to prevent the swivel 20 from pivoting relative to the casing 10, the user lowers the end 111 of the first pedal 110 so as to cause the first pedal to pivot counterclockwise in FIG. 2, thereby releasing the first lever 154 so that it then pivots counterclockwise under drive from the previously compressed spring 160 that, on being released, relaxes so as to push against the end 155 of the first lever 154.

The catch 156 carried by the first lever 154 is received in one of the catches 152 of the ring 150 that is secured to the swivel 20, thus preventing the swivel 20 from pivoting relative to the casing, and thus also preventing the castor from pivoting relative to the bed about the pivot axis 22, since the swivel 20 is stationary relative to the leg of the bed.

In contrast, the wheel(s) 12, 14 is still free to rotate about the first axis 18 since the wheel is not blocked relative to the casing 10, thereby enabling the bed to be moved in translation in a straight line.

Figure 4:
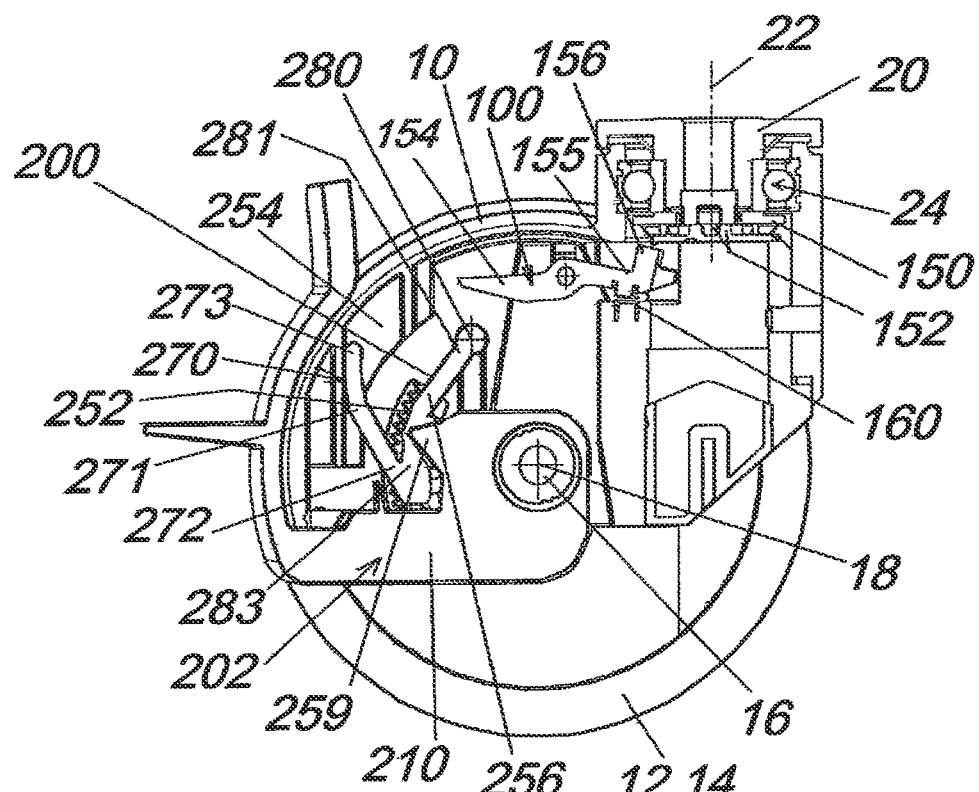
FIG. 4 is a side view in section and slightly in perspective of the castor of the invention in the embodiment shown in FIGS. 1 to 3, showing more clearly certain other structural means of the castor, more particularly those relating to means for blocking at least one wheel relative to the casing (in FIG. 4, in order to clarify the drawing, the first pedal as described below has been removed)
Figure 5:
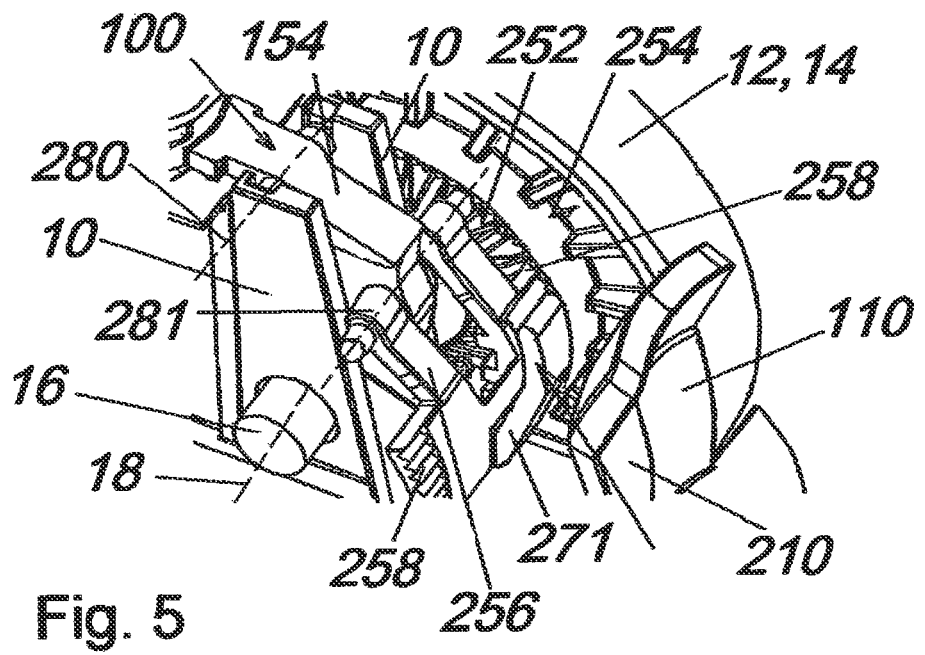
FIG. 5 is a perspective view of a portion of the castor of the invention in the embodiment shown in FIGS. 1 to 4, showing more clearly the elements that co-operate with one another and that are shown more particularly in FIG. 4.

If the user seeks to prevent the wheel 12, 14 from rotating relative to the casing 10, the user lowers the end 211 of the second pedal to cause it to pivot counterclockwise in FIG. 4 so that the projecting portion 259 pushes the second lever 256 to cause it to turn clockwise about its axis 280 from its fourth position to its third position, thereby loading the spring blade 271 and compressing the spring 260 until the catches 258 are received in the catches 252.

Figure 6:
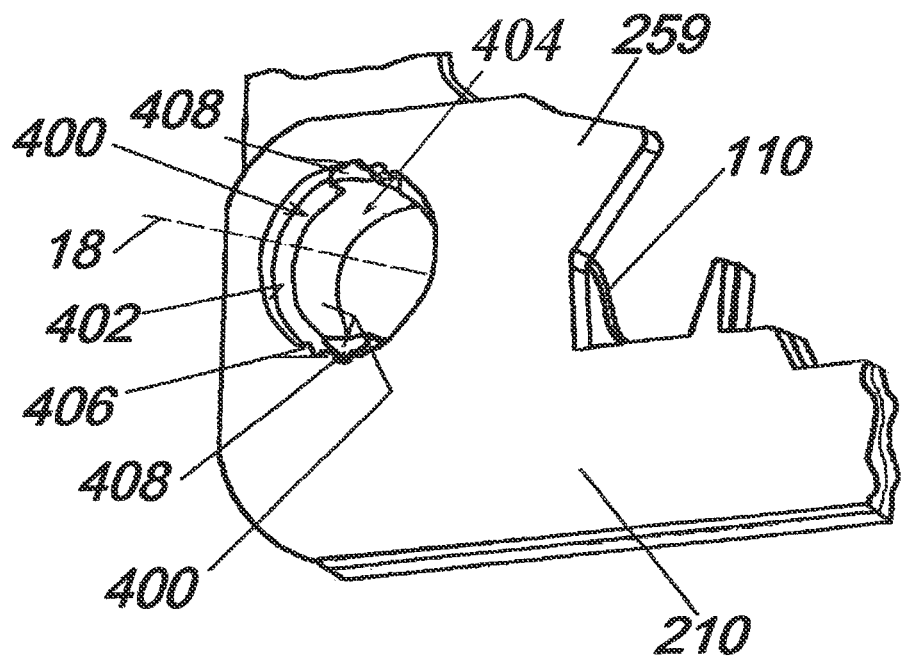
FIG. 6 is a perspective view for explaining other means constituting the castor of the invention in the embodiment shown in FIGS. 1 to 5.

As described above, it should be observed that the castor includes link means 400 arranged so that the lugs in the two sets 406, 408 co-operate mutually by meshing to hold the two pedals 110 and 210 relatively firmly together when they are put simultaneously either in their rest position or else in their actuation position (FIG. 6).

It is emphasized that the first pedal 110 is held in the actuation position by the first lever 154 that is itself subjected to pressing action from the spring 160, and that the first pedal 110 in turn holds the second pedal 210 in its actuation position by means of the two sets of lugs 406, 408, as described above, since both pedals 110, 210 are in the actuation position.

In order to release rotation of the wheel 12, 14 and pivoting of the swivel 20, it suffices to return both pedals to the rest position. The return of both pedals to their rest position is facilitated by the spring blade 271 and the compression spring 260, both of which relax.

Naturally, it is possible to block simultaneously both the swivel 20 and the wheel(s) 12, 14. It suffices to cause both pedals to move simultaneously from their rest position to their actuation position, e.g. by pressing a foot simultaneously against the two ends 111 and 211 of the pedals in order to drive the abutment 302 and the companion abutment 304 simultaneously. Under such circumstances, the above-described operations take place together so as to block both the swivel 20 and the wheel 12, 14 relative to the casing 10.

From the above description, it can clearly be seen that the castor of the invention presents a structure that enables it to satisfy the objects of the invention and that gives it genuine advantages industrially speaking since it is made up of parts that, for the great majority, can easily be obtained by molding a plastics material or the like, and that can also easily be assembled together to constitute the castor.

It is specified that FIGS. 1 to 6 essentially show a first embodiment of the castor of the invention, but that other embodiments can exist that satisfy the definition of the invention.

In particular, in this first embodiment, the castor includes parts that are caused to move relative to one another in the manner described above. Nevertheless, inverting the relative functions of those parts also comes within the ambit of the protection of the invention.

This applies for example to a second embodiment of the castor of the invention that is shown in FIGS. 7 to 9.

It should be recalled that in the first embodiment of the castor as shown in FIGS. 1 to 6, the lever 154 is arranged so that on being actuated its end 155 is raised when the projecting portion 159 secured to the first pedal 110 acts on the other end of this lever in order to block the swivel 20 by causing the catches 156 to mesh in the catches 152, the spring 160 then being loaded so as to act in resilient traction to lower the end 155 when unblocking of the pivoting of the swivel 20 is implemented by causing the catches 156 to unmesh from the catches 152.

As mentioned above concerning inverting functions, in the second embodiment of the castor shown in FIGS. 7 to 9, this lever 154 is in contrast arranged in such a manner that on being actuated, its end 155 is lowered (opposite to that which takes place in the first embodiment described above) when the projecting portion 159 secured to the first pedal 110 acts on the other end of this lever in order to block the swivel 20 by causing the catches 156 to mesh in the catches 152, the spring 160 then being compressed so as to exert resilient thrust for raising said end 155 when it is necessary to unblock the swivel 20 by causing the catches 156 to unmesh from the catches 152.

It should also be observed in this second embodiment shown in FIGS. 7 to 9, that the swivel 20 presents a structure that is different from that shown in FIGS. 1 to 6. This difference lies essentially in the fact that instead of having a single bearing of the ball bearing type or the like, it has two, one at each end of the swivel, thereby giving the castor better stability and more reliability.

The invention claimed is:

1. A castor with combined blocking, the castor comprising: a casing (10); at least one wheel (12, 14); means for mounting the wheel to rotate relative to the casing on a shaft (16) defined on a first axis (18); a swivel (20) defined on a second axis (22); means (24) for mounting the swivel (20) to pivot relative to the casing (10) with the second axis (22) substantially perpendicular to the first axis (18); first controllable blocking means (100) for blocking pivoting of the swivel (20) relative to the casing (10); first control means (102) for actuating said first controllable blocking means (100); second controllable blocking means (200) for blocking rotation of the wheel (12, 14) relative to the casing (10); second control means (202) for actuating said second controllable blocking means (200); and means (300) for coupling said first and second control means (102, 202) in such a manner that: when the first controllable blocking means (100) are actuated on their own by said first control means, the second controllable blocking means (200) are not actuated; and when at least the second controllable blocking means (200) are actuated by said second control means, the first controllable blocking means (100) are also actuated by said first control means (102);

wherein the first and second control means (102, 202) for actuating respectively the first and second controllable blocking means (100, 200) comprise respectively a first pedal (110) and a second pedal (210) both pivotally mounted on said shaft (16), each pedal (110, 210) having at least one end that emerges from the casing (10), each pedal (110, 210) being pivotally mounted on said shaft (16) to pivot between a rest position and an actuation position, the rest position being the position in which neither pedal actuates the corresponding controllable blocking means (100, 200), and the actuation position being the position in which both pedals actuate the corresponding controllable blocking means (100, 200);

further comprising link means (400) mounted in co-operation between the two pedals (110, 210), these link means being arranged in such a manner that both pedals are lightly held relative to each other in a given position, and may be disengaged from this given position when they are subjected to a relatively low level of torque;

wherein the link means (400) are constituted: by a circularly cylindrical orifice (402) made in one of the two pedals (210), the axis of the orifice coinciding with the first axis (18); by at least one circularly cylindrical sleeve portion (404) projecting from the other pedal (110) to engage in said orifice (402), said sleeve portion being of a diameter no greater than that of said orifice (402); and two sets of lugs (406, 408) made respectively on the facing cylindrical faces of the orifice (402) and of the sleeve portion (404) in such a manner that at least one lug in one set co-operates by meshing between two lugs of the other set and is suitable for passing over the lugs of the other set by elastic deformation.

2. A castor according to claim 1, wherein the means (300) for coupling said first and second control means (102, 202) together are constituted by an abutment (302) made on the first pedal (110) and by a companion abutment (304) made on the second pedal (210), the abutment and companion abutment (302, 304) being arranged relative to each other on their respective pedals in such a manner that: the companion abutment (304) is in contact with the abutment (302) when both pedals (110, 210) are in their rest position; when the first pedal (110) is driven on its own to pivot about the first axis (18) to pass from the rest position to the actuation position, the abutment (302) moves away from the companion abutment (304); and when the second pedal (210) is pivoted about the first axis (18) to pass from the rest position to the actuation position, the companion abutment (304) entrains the abutment (302) in the same pivoting movement, and therefore correspondingly entrains the first pedal (110) to cause the first pedal also to go from the rest position to the actuation position.

3. A castor according to claim 1, wherein the first controllable blocking means (100) for blocking pivoting of the swivel (20) relative to the casing (10) comprise:
a ring (150) having male and female first catches (152), said ring being mounted in co-operation with said swivel (20) in coaxial manner;
a first lever (154), one end (155) of the first lever including at least one male second catch (156), the first lever being mounted to pivot between a first position and a second position relative to the casing (10) in such a manner that, in the first position of the first lever the male second catch (156) penetrates into one of the female first catches (152), and in the second position of the first lever the male second catch (156) does not co-operate with any of the first catches (152);
first resilient return means (160) for urging the first lever (154) to return from the second position to the first position; and
first means (158) for causing the first lever (154) to pivot between the first and second positions, said first means for causing the first lever to pivot being mounted in co-operation on the first pedal (110).

4. A castor according to claim 1, wherein the second controllable blocking means (200) for blocking rotation of the wheel (12, 14) relative to the casing comprise:
male and female third catches (252) made on the face (254) of the wheel for blocking that faces towards the casing (10);
a second lever (256) pivotally mounted on said casing via a first end (281) about a third axis (280) substantially parallel to the first axis (18), the second lever carrying at least a male fourth catch (258) complementary to the female third catches (252), the second lever (256) being mounted to pivot relative to the casing (10) between a third position and a fourth position in such a manner that, in the third position of the second lever, the male fourth catch (258) penetrates into one of the female third catches (252), and in the fourth position of the second lever, the fourth catch (258) does not co-operate with any of the third catches (252);

resilient tensioning means (270) for tending to hold the second lever in the fourth position; and second means (290) for causing the second lever (256) to pivot between the fourth and third positions, these second means for causing the second lever to pivot being mounted in co-operation on the second pedal (210).

5. A castor according to claim 4, further comprising third controllable return means (260) for tending to cause said second pedal (210) to pass from the actuation position to the rest position.

6. A castor according to claim 4, wherein the resilient tensioning means (270) for tending to hold the second lever in the fourth position are constituted by a spring blade (271) having a first end (272) secured to the second end (283) of the second lever (256) in such a manner as to co-operate with said second lever to form substantially a V-shape, the second end (273) of the spring blade (271) co-operating with the casing (10) by sliding in contact therewith.

7. A castor according to claim 5, wherein the resilient tensioning means (270) for tending to hold the second lever in the fourth position are constituted by a spring blade (271) having a first end (272) secured to the second end (283) of the second lever (256) in such a manner as to co-operate with said second lever to form substantially a V-shape, the second end (273) of the spring blade (271) co-operating with the casing (10) by sliding in contact therewith.

\* \* \* \* \*